June 7, 1949. E. HAECKS 2,472,073
DOUGH CUTTING AND PLACING MACHINE
Filed Jan. 30, 1946 2 Sheets-Sheet 2
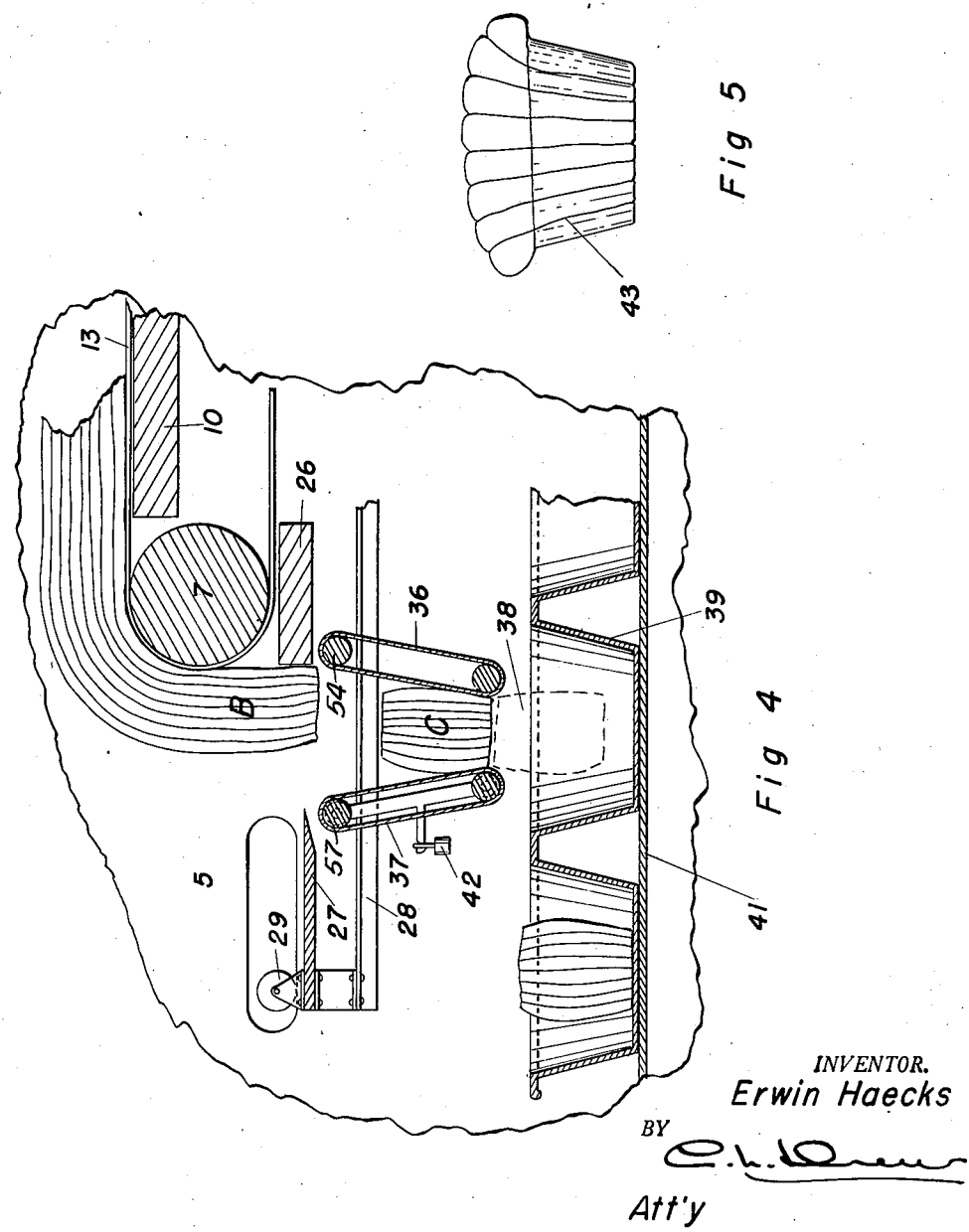
INVENTOR.
Erwin Haecks
BY
Att'y Patented June 7, 1949

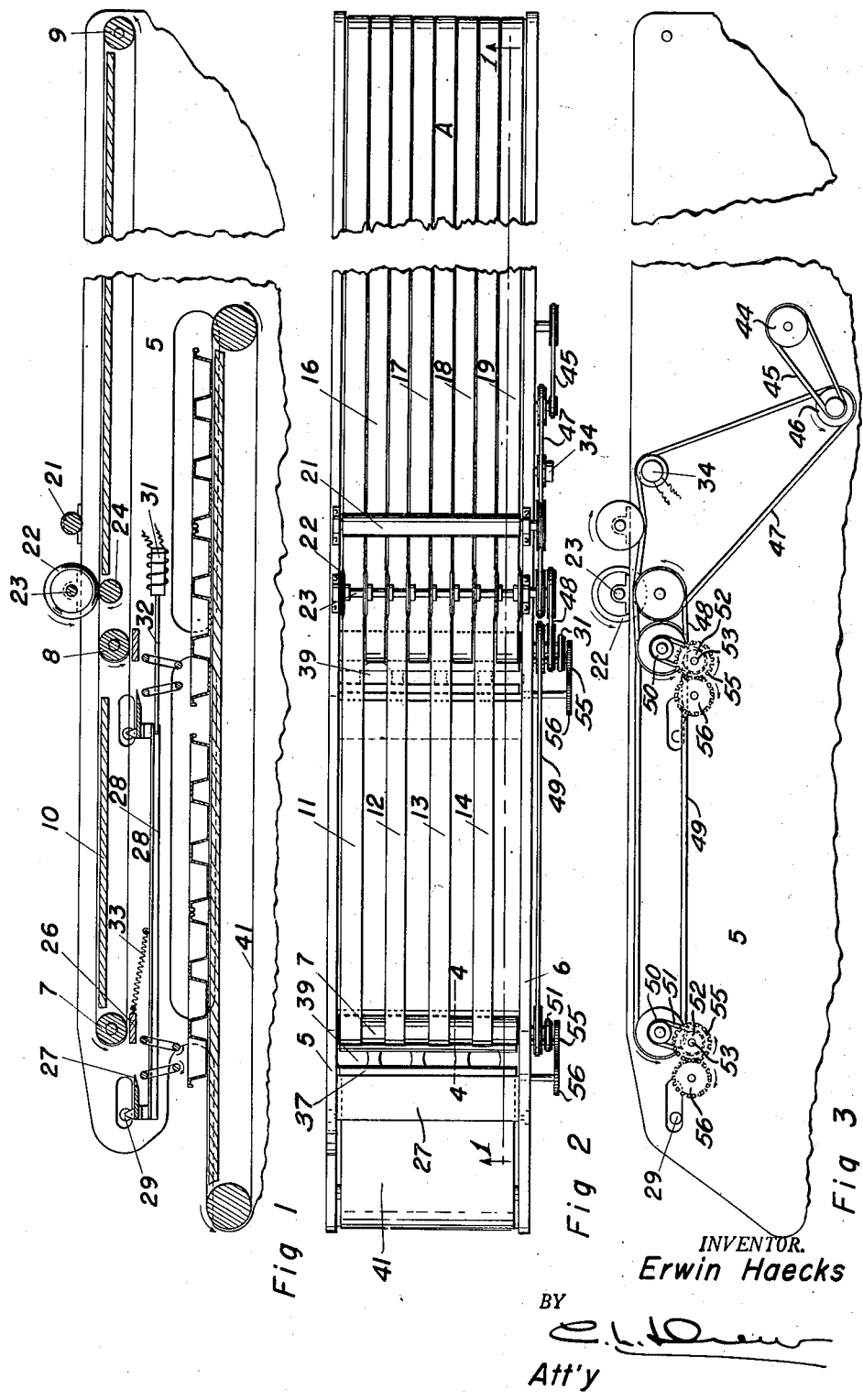

2,472,073

UNITED STATES PATENT OFFICE 2,472,073

DOUGH CUTTING AND PLACING MACHINE

Erwin Haecks, San Francisco, Calif.

Application January 30, 1946, Serial No. 644,384

2 Claims. (Cl. 107—7)

1

This invention relates to improvements in bakery equipment and has particular reference to a machine for cutting dough and placing the same in individual muffin cups or pans as they are called.

The principal object of this invention is to produce a machine, wherein a quantity of dough may be passed through said machine, cut into strips, then cut into small pieces, and each piece positioned in a muffin cup in a definite place, whereby when the dough rises and afterward bakes it will expand in such a way as to form muffins, commonly termed butter muffins and which are so formed that sections may be broken away one from the other without disturbing the appearance of the remainder of the muffin.

A still further object is to produce a machine which will be automatically operated, economical to manufacture and readily cleaned so that it may be maintained in a sanitary condition.

Also, a still further object is to produce a machine which will conserve a considerable amount of labor.

Other objects and advantages will be apparent during the course of the following description.

In the accompanying drawings forming a part of this specification and in which like numerals are employed to designate like parts throughout the same, Fig. 1 is a vertical cross-section taken on the line 1—1 of Fig. 2.

Fig. 2 is a top plan view of Fig. 1.

Fig. 3 is a fragmentary side elevation of Fig. 2.

Fig. 4 is an enlarged fragmentary detail view showing the manner in which the dough is positioned in the muffin cups and taken on the line 4—4 of Fig. 2, and Fig. 5 is a side view of a muffin of the variety generally known as a butter muffin.

In the preparation of butter muffins the usual practice is to roll out a quantity of the dough in the form of a sheet; then to butter and fold the sheet upon itself several times, both sidewise and lengthwise and each time a fold is made it is again buttered, resulting in the formation of a laminated sheet.

The laminated sheet is then cut into lengthwise strips and these strips in turn are cut into small pieces weighing approximately one and one quarter ounce. It is then required that two operators take the small pieces which one baker is cutting as described above and place the same in the muffin cups in such a way that the various layers of laminations will be in a vertical position in the cup.

2

This operation is slow and tedious; also, the human element enters into the procedure, because if the operators are at all careless, some of the pieces will not be placed in the muffin cups in the correct position.

I have, therefore, devised a machine wherein a sheet of laminated dough is passed through a machine, cut into strips lengthwise; then cut into smaller portions and finally deposited in the muffin cups in an upright position.

In the accompanying drawings wherein for the purpose of illustration is shown a preferred embodiment of my invention, the numerals 5 and 6 designate the sides of the machine which serve to support a plurality of rollers, as shown at 7, 8 and 9, over which roller conveyor belts are reaved. Some of these conveyor belts, as for instance the belts 11, 12, 13 and 14, extend between the rollers 7 and 9, while the conveyor belts 16, 17, 18 and 19 only extend between the rollers 8 and 9.

This arrangement forms a continuously moving area A at one end of the machine, upon which the laminated dough is placed. This dough will travel forward with the movement of the conveyor belts 11 to 19 inclusive, and in so doing passes beneath a roller 21 which serves as a rolling pin to limit the thickness of the dough sheet.

The dough now encounters a plurality of rotary knives 22 mounted upon a driven shaft 23 and bearing against a wooden roller 24; consequently, as the dough passes these knives 22 it will be cut into strips, each riding its individual conveyor belt.

The dough on the belts 11 to 14 inclusive will travel to the far end of the machine while the dough on the belts 16 to 19 inclusive will pass over the roller 8, and due to the nature of the dough, not being self supporting, the same will turn downwardly over the roller 8 and pass through an opening in the table top 10, as best shown at "B" in Fig. 4. When the dough on the belts 11 to 14 reaches the roller 7 a similar action will ensue, this dough also turning downwardly through an opening in the table-top 10.

At 26 I have shown a cutting block, against which a cutter 27 engages, which cutter is mounted upon a reciprocating frame 28, supported by rollers 29, which ride in openings in the sides 5 and 6 and form a cutting-off arrangement which is reciprocated by a solenoid 31, connected to the frame 28 by a pull-rod 32.

A spring 33 serves to return the cutter 27 to its normal position. It is, of course, understood that this cutoff mechanism is duplicated at the discharge end of each set of conveyor belts.

As the dough moves downwardly from the position "B" the cutter mechanism is caused to reciprocate through the medium of a timer arrangement 34, which is connected to the solenoid 31 and actuates the same at the proper time, governed by the main drive mechanism which controls the speed of the conveyor belts. This main drive mechanism includes a motor which is connected by a pulley 44 and a belt 45 with a driving pulley 46 which drives a belt 47 rotating the timer 34. The belt 47, through belts 48 and 49, drives the rollers 7 and 8 and also sprockets 50 on the shafts of rollers 7 and 8.

As soon as the dough is cut off it drops to the position "C" between vertically arranged conveyor belts 36 and 37, which conveyor belts serve to hold the dough in the proper position and to feed it downwardly and slowly, so that it will assume the dotted line position 38. The sprockets 50 are connected by chains 51 to sprockets 52 on the shafts 53 of the upper drums 54 of the belts 36. The shaft 53 of each upper drum 54 carries a gear 55 which meshes with a gear 56 on the shaft of the upper drum 57 of the belt 37.

It will then drop into the muffin cup 39 and into a position so that the laminations are vertically arranged.

The muffin pans may be made up of a series of cups joined together in any manner and will rest upon a conveyor 41 which travels at the proper speed to present a cup in the proper receiving position at each actuation of the cutters 27.

It will be noted that one of the vertical conveyor belts, as for instance, the belt 37 is so arranged that it has a slight swinging movement and a counterweight 42 tends to keep the lower end of the belt 37 swung toward the belt 36, which exerts a soft, but positive, pressure against the dough at the point "C" and this prevents the sudden dropping of the dough, but rather places the dough gradually in the cup in such a gentle manner that the dough will not fall over.

The result of this construction is that when the dough is fed through the machine it is cut into small pieces and deposited in the cups in a definite upright position, so that the laminations of the dough when baked will form a muffin, as shown at 43 of Fig. 5.

It is, of course, obvious that any means can be used to drive the various parts at the proper speed and in the proper direction, such as shown by the arrangement in Fig. 3.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a machine of the kind described, a main endless belt conveyor having an upper horizontal run for carrying dough and provided with a belt carrying roll at its delivery end whereby dough from the conveyor will move from horizontal to vertical position, a pair of downwardly converging endless belt guides positioned at the delivery end of said main conveyor to receive dough delivered therefrom, said guides having spaced belt rolls at their upper ends gear connected for simultaneous rotary movement, one of said guides being swingingly supported from its upper end, a counterweight carried by said last mentioned dough guide urging its lower end yieldably toward the other dough guide, driving means connecting said main belt roll with one of the dough guide gears, and means to drive said main belt.

2. In a machine of the kind described, a main endless belt conveyor having an upper horizontal run for carrying dough and provided with a belt carrying roll at its delivery end whereby dough from the conveyor will move from horizontal to vertical position, a pair of downwardly converging endless belt guides positioned at the delivery end of said main conveyor to receive dough delivered therefrom, said guides having spaced belt rolls at their upper ends gear connected for simultaneous rotary movement, one of said guides being swingingly supported from its upper end, a counterweight carried by said last mentioned dough guide urging its lower end yieldably toward the other dough guide, driving means connecting said main belt roll with one of the dough guide gears, dough severing means guided for movement across the space above the upper ends of said dough guides, and means controlled by the main belt drive intermittently actuating said dough severing means.

ERWIN HAECKS.

REFERENCES CITED

The following references are of record in the file of this patent:

UNITED STATES PATENTS

| Number | Name | Date |
|---|---|---|
| 492,220 | Mitchell | Feb. 21, 1893 |
| 1,039,795 | Pfenninger | Oct. 1, 1912 |
| 1,270,096 | Baker | June 18, 1918 |
| 1,781,546 | Harber | Nov. 11, 1930 |
| 1,844,142 | Barili | Feb. 9, 1932 |
| 2,008,036 | Pointon et al. | July 16, 1935 |